US007539145B2

(12) United States Patent
Semon et al.

(10) Patent No.: US 7,539,145 B2
(45) Date of Patent: May 26, 2009

(54) SYSTEM AND METHOD FOR DETERMINING WHETHER DOCSIS-ENABLED DEVICES IN A HFC CABLE NETWORK ARE CO-LOCATED

(75) Inventors: Doug Semon, Denver, CO (US); Kenneth Gould, Oakton, VA (US)

(73) Assignee: Time Warner Cable, Inc., New York, NY (US)

( * ) Notice: Subject to any disclaimer, the term of this patent is extended or adjusted under 35 U.S.C. 154(b) by 737 days.

(21) Appl. No.: 11/240,130

(22) Filed: Sep. 30, 2005

(65) Prior Publication Data

US 2007/0076705 A1 Apr. 5, 2007

(51) Int. Cl.
*H04J 1/16* (2006.01)

(52) U.S. Cl. ...................................... 370/241
(58) Field of Classification Search ................ 370/241, 370/242, 248, 251, 252, 464; 348/180, 192
See application file for complete search history.

(56) References Cited

U.S. PATENT DOCUMENTS

| 6,687,907 B1 * | 2/2004 | Bortolini | 725/107 |
| 7,006,446 B1 * | 2/2006 | Anderson | 370/248 |
| 7,372,872 B2 * | 5/2008 | Danzig et al. | 370/480 |
| 2005/0183130 A1 * | 8/2005 | Sadja et al. | 725/107 |

OTHER PUBLICATIONS

"High Resolution Ping" Google Groups. Mar. 2, 2001; http://groups.google.com.

* cited by examiner

*Primary Examiner*—Dmitry Levitan
(74) *Attorney, Agent, or Firm*—The Marbury Law Group, PLLC

(57) ABSTRACT

A system and method for determining if DOCSIS-enabled devices (DEDs) connected to an HFC cable network are co-located. Subscriber account data is acquired to determine the DEDs associated with a subscriber account. The MAC address of the DEC is used to obtain the MAC domain to which a DED is assigned and the ranging offset value associated with the DED. An alert is issued if multiple DEDs associated with a subscriber account are associated with different MAC domains. The alert signifies that DEDs associated with the account are not co-located. Where DEDs associated with an account are associated with the same MAC domain, the normalized ranging offset values associated with the subscriber's DEDs are compared to determine if the difference in their values exceeds a predetermined threshold. If the difference in their values exceeds a predetermined threshold, an alert is issued. The alert again signifies that DEDs associated with the account are not co-located.

20 Claims, 5 Drawing Sheets

SYSTEM AND METHOD FOR DETERMINING WHETHER DOCSIS-ENABLED DEVICES IN A HFC CABLE NETWORK ARE CO-LOCATED

BACKGROUND

Embodiments of the present invention are directed to providing services to subscribers in a hybrid-fiber-coax (HFC) cable network and more specifically to determining if DOCSIS-enabled devices connected to the HFC cable network are co-located.

In the cable environment, access to the cable network's high speed data (HSD) service is provided through a cable modem. Increasingly, cable modems are required to comply with an industry standard referred to as the "Data Over Cable Service Interface Specification" or DOCSIS. DOCSIS provides a set of standards and a certifying authority by which cable companies can achieve cross-platform functionality in Internet delivery.

A DOCSIS compliant cable network comprises a cable modem termination system (CMTS) connected to DOCSIS compliant cable modems (DCCMs). DCCMs act as a digital interface between customer premises equipment and the HFC cable network. The CMTS exchanges digital signals with cable modems on a cable network and acts as a gateway to other networks.

DCCMs and other devices that are connected to a cable network have a unique a media access controller (MAC) address, also known as the physical address. This permits the cable network operator to use the MAC address as a vehicle for authorizing access to its network and further aids in billing users for services. Using a provisioning/authentication database comprising the DCCM MAC address, CMTSs within the cable network are able to determine whether a user attempting to access the cable network is a subscriber and, if so, the kind of services the subscriber is entitled to receive.

DCCMs are being placed inside more and more devices. For example, set top boxes, media terminal adapters, consumer electronics equipment such as TV sets, DVRs and audio devices may be integrated with a DCCM. In addition, the OpenCable Applications Platform Specification (OCAP) establishes standards for devices that can be connected to any cable system. Consumers may thus own an OCAP device that is equipped with a DCCM (the integrated device sometimes referred to as a DOCSIS set top gateway client or DSG client). To use the DSG client on a particular cable network, a subscriber registers the DSG client with the cable system operator.

Cable system operators have leveraged the improvement in two-way technologies to offer an expanding menu of new services. With the expansion of service offerings, multiple system operators (MSOs) typically "bundle" disparate services. Bundles are based on economic models that assume that the subscriber household is the user of the bundled services. The bundled services are also intended to attract new customers. The economics of the service bundle fail, however, when components of the bundle are shared among a subscriber and non-subscribers. This may occur in several ways.

By way of illustration, a subscriber who already has a DCCM is registered with an MSO buys a DSG client that supports web browsing, e-mail and chat. The subscriber asks the MSO to "duplicate" services on both the DCCM and the DSG client. That is, the DSG client and the DCCM are registered with the subscriber and associated with the same services such that the subscriber may receive service on both devices simultaneously. However, in this case, the subscriber uses an Ethernet connector on the DSG client to feed a home router thereby replacing the DCCM. The subscriber then gives the DCCM to a neighbor who connects it to the cable network. Because the DCCM MAC address is recognized by the cable network and is authorized to receive HSD services, the neighbor receives HSD services without any obligation to pay the MSO.

In the example described above, the theft of cable services by the neighbor costs the MSO the economics of the bundle and the opportunity of selling services to the neighbor.

What would be useful is a system and method for confirming with reasonable certainty that DCCM-enabled devices associated with a customer account are co-located and for identifying when a subscriber account is being "shared" in a way that violates the terms of the service agreement between the subscriber and a cable service provider.

SUMMARY

In an embodiment of the present invention, a co-location processor (CLP) comprises a co-location agent (CLA) and a co-location alert manager (CLAM).

The CLA periodically polls a subscriber billing system to acquire subscriber account data. The billing system maintains a list of all DOCSIS-enabled devices (DEDs) associated with a single account. According to an embodiment of the present invention, subscriber account data comprises a subscriber account number, a MAC addresses of the DEDs associated with that account number, and DED identifying information. By way of illustration and not as limitation, DED identifying information comprises a manufacturer identifier, a model identifier, a release identifier, and a firmware identifier.

The CLA uses MAC addresses to poll a CMTS for DED data. According to an embodiment of the present invention, DED data comprises a DED MAC address, a DED ranging offset value expressed in "ticks," and a MAC domain identifier that identifies the logical MAC domain on the CMTS to which the DED is connected. The MAC domain represents a logical grouping of DEDs managed by a CMTS. A MAC domain may be limited to a single CMTS blade, may span multiple CMTS blades, and may share a CMTS blade with other MAC domains. Where the MAC domain is limited to a single CMTS blade, the MAC domain may be identified by the blade identifier. The CLA thus is "aware" of all of the DED devices associated with each subscriber account as well as each DED device associated with each CMTS MAC domain.

According to an embodiment of the present invention, the CLA also verifies that the list of DEDs associated with an individual subscriber account does not span multiple CMTS MAC domains. If a spanning violation is detected, an alert is sent to the CLAM. In yet another embodiment of the present invention, the CLA uses the DED identifying information to obtain a normalizing factor for each DED associated with a single account number. The normalizing factor is used to normalize the ranging offset value associated with a DED. Normalizing the ranging offset value accounts for a component of the ranging offset value that reflects the particular packet processing delays of a model/release of DED operating a specific firmware release. The normalized ranging offset values of DEDs may be compared to determine relative distances between the DEDs and the CMTS. If the difference in the normalized ranging offset values of any two DEDs associated with a single subscriber exceeds a threshold value, it may be indicative of the fact that the DEDs are in different physical locations. Again, an alert is sent to the CLAM.

It is therefore an aspect of the present invention to confirm the co-location of multiple DEDs associated with a subscriber by periodically determining the MAC domain of each DED associated with that subscriber.

It is another aspect of the present invention to confirm the co-location of multiple DEDs associated with a subscriber by periodically evaluating the normalized ranging data of each DED associated with that subscriber.

It is still another aspect of the present invention to issue an alert to a cable system operator if the co-location of multiple DEDs associated with a subscriber cannot be confirmed.

It is yet another aspect of the present invention to detect the unauthorized sharing of bundled services by a subscriber with a non-subscriber.

It is yet another aspect of the present invention to accurately bill for services being provided to subscribers.

These and other aspects of the present invention will become apparent from a review of the description that follows.

In an embodiment of the present invention, a co-location processor for a hybrid-fiber-coax (HFC) cable network comprises a co-location alert manager, and a co-location agent. The co-location agent acquires a first ranging offset value associated with a first DOCSIS-enabled device (DED) and a second ranging offset value associated with a second DED. The first and second DEDs are associated with a subscriber account. The co-location agent applies a first normalization factor to the first ranging offset value to obtain a first normalized ranging offset value and applies a second normalization factor to the second ranging offset value to obtain a second normalized ranging offset value. A "delta" offset value is determined equal to the absolute value of the difference between the first normalized ranging offset value and the second normalized ranging offset value. A determination is made whether the delta offset value exceeds a predetermined threshold. An alert is sent to the co-location alert manager if the delta offset value exceeds a predetermined threshold.

In an embodiment of the present invention, a DED comprises a standalone cable modem. In another embodiment of the present invention, a DED comprises a component within a device connectable to the HFC cable network.

In still another embodiment of the present invention, the co-location agent acquires subscriber account data for the subscriber account. In this embodiment, subscriber account data comprises a subscriber account number, a first MAC address associated with the first DED and a second MAC address associated with the second DED. In even another embodiment of the present invention, the first and second ranging offset values are acquired from a cable modem termination system using the first and second MAC addresses.

In another embodiment of the present invention, the alert manager receives an alert from the co-location agent, and routes the alert to a customer support center associated with the subscriber account number.

In still another embodiment of the present invention, the co-location agent acquires a first cable MAC domain identifier associated with the first DED and a second MAC domain identifier associated with the second DED. The co-location agent determines whether the first MAC domain identifier differs from the second MAC domain identifier and sends an alert to the alert manager if the first MAC domain identifier differs from the second MAC domain identifier.

In even another embodiment of the present invention, the co-location agent sends a confirmation command to the first and second DEDs. The co-location agent receives a first response from the first DED to the first confirmation command and a second response from the second DED to the second confirmation command. A determination is made from the first and second response whether the first DED and second DED are co-located. A confirmed alert is sent to the co-location alert manager if the first DED and second DED are not co-located. By way of illustration and not as a limitation, in an embodiment of the present invention, the confirmation command comprises an HR PING command.

In an embodiment of the present invention, a cable theft of service alert system comprises a co-location agent and a rules engine. The co-location agent acquires a first ranging offset value associated with a first DOCSIS-enabled device (DED) and a second ranging offset value associated with a second DED. The first and second DEDs are associated with a subscriber account. The co-location agent applies a first normalization factor to the first ranging offset value to obtain a first normalized ranging offset value and applies a second normalization factor to the second ranging offset value to obtain a second normalized ranging offset value. A "delta" offset value is determined equal to the absolute value of the difference between the first normalized ranging offset value and the second normalized ranging offset value. A discrepancy record comprising the DED values and the delta offset values is created if the delta offset value exceeds a predetermined threshold. The rules engine receives the discrepancy record associated with the subscriber and subscriber account data from a subscriber datastore. The rules engine applies a theft rule to the delta offset values and the subscriber account data. A determination is made whether a theft of service has occurred. An alert is issued to a theft of service server if the theft of service has occurred.

An embodiment of the present invention provides a method for confirming that DOCSIS-compliant devices operating in a hybrid-fiber-coax (HFC) cable network are co-located. A first ranging offset value associated with a first DOCSIS-enabled device (DED) and a second ranging offset value associated with a second DED are acquired. The first and second DEDs are associated with a subscriber account. A first normalization factor is applied to the first ranging offset value to obtain a first normalized ranging offset value. A second normalization factor is applied to the second ranging offset value to obtain a second normalized ranging offset value. A "delta" offset value equal to the absolute value of the difference between the first normalized ranging offset value and the second normalized ranging offset value is determined. A determination is made whether the delta offset value exceeds a predetermined threshold. An alert is sent to a co-location alert manager if the delta offset value exceeds the predetermined threshold.

DETAILED DISCUSSION

The following terms used in the description that follows. The definitions are provided for clarity of understanding:

CMTS—a cable modem termination system.

DED—A DOCSIS-enabled device. A device that performs the functions of a DOCSIS-compliant cable modem. A DED may be a standalone device or a device that comprises a DCCM.

DOCSIS—"Data Over Cable Service Interface Specification" issued by Cable Television Laboratories, Inc.

MAC address—the media access controller address of a DED.

MAC domain—A logical grouping of DEDs managed by a CMTS. A MAC domain may be limited to a single CMTS blade, may span multiple CMTS blades, and may share a CMTS blade with other MAC domains. Where the MAC domain is limited to a single CMTS blade, the MAC domain may be identified by the blade identifier.

Normalized Ranging Offset Value—A ranging offset value associated with a DED that has been adjusted to account for differences in packet handling of a particular DED. Differences in normalized ranging offset values of DEDs associated with a CMTS are indicative of differences in distances from that CMTS.

Figure 1:
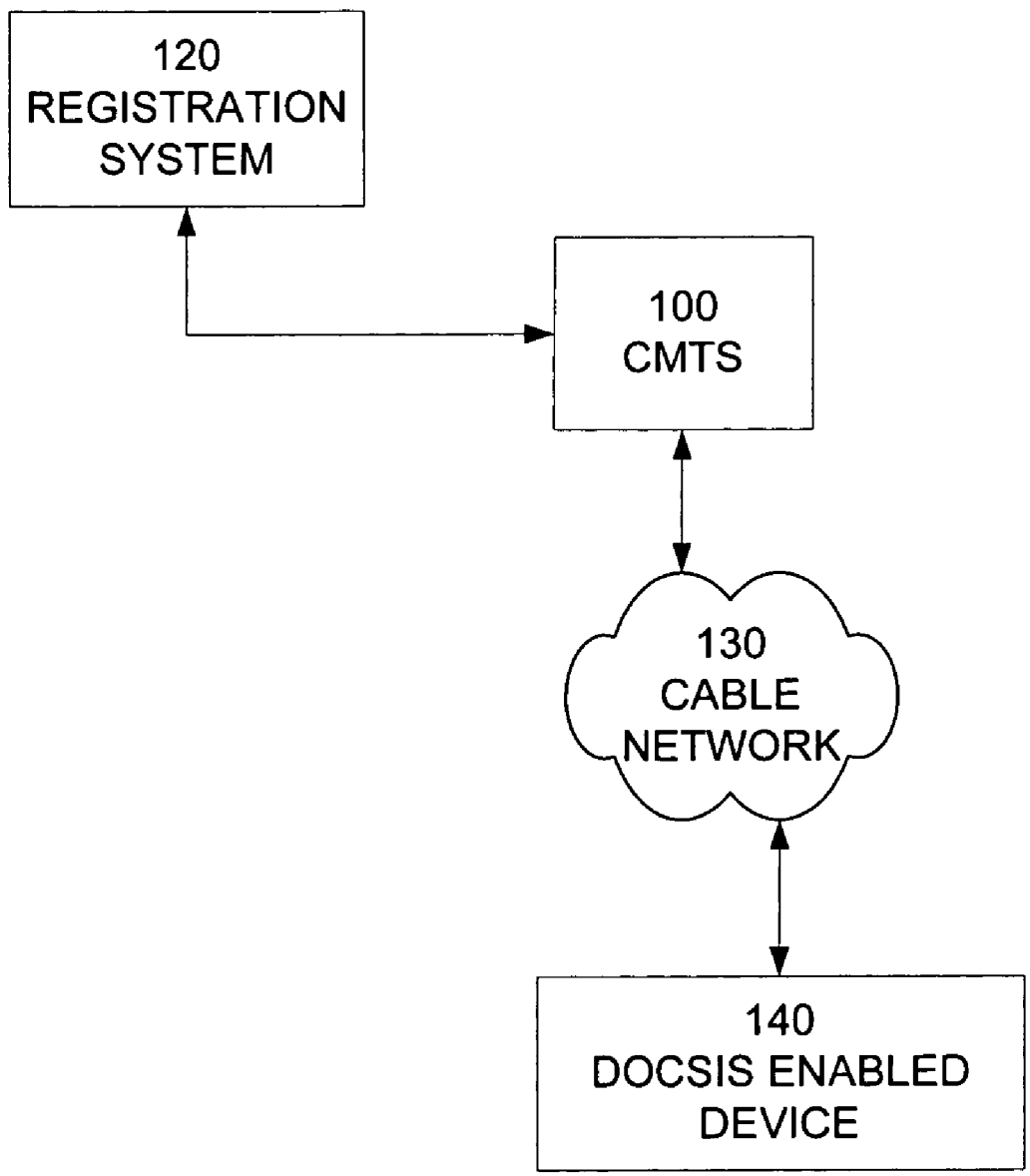
FIG. 1 illustrates a typical configuration of a CMTS, a billing system, a registration system, and DOCSIS-compliant device as known in the art.

The behavior of a CMTS in cable network is well known in the art. FIG. 1 illustrates a typical configuration of a CMTS, a billing system, a registration system, and DOCSIS-compliant device as known in the art. Referring to FIG. 1, a CMTS 100 communicates with a DOCSIS-compliant device (DED) 140 via cable network 130. Cable network 130 is typically a hybrid-fiber-coax (HFC) network. The CMTS 100 also interacts with a registration system 120 to obtain the MAC address of DEDs that are authorized to receive services from the CMTS.

When DED 140 is connected to the cable network 130 and is powered on, it sends a series of ranging requests to the CMTS 100. The CMTS 100 replies with ranging responses that instruct the DED 140 to adjust its timing, transmit power levels, and transmit frequency. This is done so that every DED communicating with CMTS 100 "appears" to be the same distance from CMTS 100 (from the CMTS's point of view).

The "ranging offset value" (also known as "time offset value") is the value that represents the round trip delay from CMTS 100 to DED 140. This value is calculated by the CMTS and the DED as a part of the initial ranging process when a DED comes online. It is important for a CMTS and DED to have an accurate idea of the correct ranging offset value so that upstream transmissions from DEDs are properly synchronized when they arrive at the CMTS at the appropriate time. If a packet arrives earlier or later than expected by the CMTS, a collision may occur with other packets resulting in the loss of data.

Some DEDs may violate certain parts of the DOCSIS specification when performing initial ranging and may produce a negative ranging offset value or a ranging offset value that is significantly smaller than the real value. When a DED shows zero, or negative timing offsets it is not fully DOCSIS compliant and typically results from the DED improperly caching the last used timing offset, going offline, and then re-using that timing offset when re-establishing registration. As the DOCSIS cable network matures, it is anticipated that non-compliant DEDs will be replaced or upgraded with newer revisions of DED firmware.

The ranging offset value, which is an indication of the round trip delay between a CMTS and DED, is typically determined by four major factors:

The physical distance of the DED from the CMTS
The Downstream Modulation Scheme and interleave depth
The Upstream Modulation Scheme and channel width
The Model of DED and firmware An example output from a typical system using the same model of DED is a follows:

TABLE 1

| Interface | OFFSET | MAC address |
| --- | --- | --- |
| Cable3/0/U0 | 3011 | 0001.9659.4461 |
| Cable3/0/U0 | 2647 | 0001.9659.5370 |
| Cable3/0/U0 | 3011 | 0001.9659.4415 |
| Cable3/0/U0 | 3007 | 0001.9659.43fd |

As will be appreciated by those skilled in the art, not all DEDs process packets in the same way. Some component of the ranging offset value may also reflect the particular packet processing delays of the DED. For DEDs from different families having different DED identifying information, the ranging offset values are first normalized to account for differences in packet handling. The normalized ranging offset values may then be compared to determine relative distances between the DEDs and the CMTS. By way of illustration and not as limitation, DED identifying information comprises a manufacturer identifier, a model identifier, a release identifier, and a firmware identifier.

The ranging offset value is calculated as a part of the initial ranging process that DEDs must complete in order to connect to a CMTS. The DED must wait to hear a SYNC message sent by the CMTS with the correct system timestamp before it knows what the current timestamp is. Note that due to the propagation delay encountered by the SYNC message, by the time the DED hears the SYNC message stating that the system timestamp is 0, the CMTS's clock has incremented by some number of ticks.

The CMTS sends the DED a MAP message commanding the DED to send an initial ranging request at a particular time "T" relative to the CMTS clock. Since the DED does not know when time "T" occurs according to the clock on the CMTS, the DED sends the initial ranging request at timestamp "T" according to its own clock.

The CMTS expects that initial ranging requests could arrive at any time between CMTS time T and T+I, where I is the time allocated to receive initial ranging requests. "I" is large enough to accommodate the propagation delay between the CMTS and a DED at the furthest point in the cable plant.

The DED sends its initial ranging request when its internal timestamp is "T" but by the time the initial ranging request gets to the CMTS, the CMTS's clock has increment to T+Offset. This means that the CMTS can calculate the ranging offset value of this DED to be T+OFFSET−T=OFFSET units. The CMTS communicates this ranging offset value to the DED by sending a ranging response message. Once the DED receives this message it is able to add the appropriate ranging offset value to any future messages sent to the CMTS. For example, if the ranging offset value is 8, when the CMTS request a data transmission from the DED to be received at the CMTS at T=70, the DED will transmit the data at T=62 according to the DED clock.

This offset is determined by the physical distance between CMTS 100 and DED 140, the downstream modulation scheme and interleave depth, and the upstream modulation scheme and channel width, and may be related to a particular DED by DED identifying information. By way of illustration and not as limitation, DED identifying information comprises a manufacturer identifier, a model identifier, a release identifier, and a firmware identifier.

Figure 2:
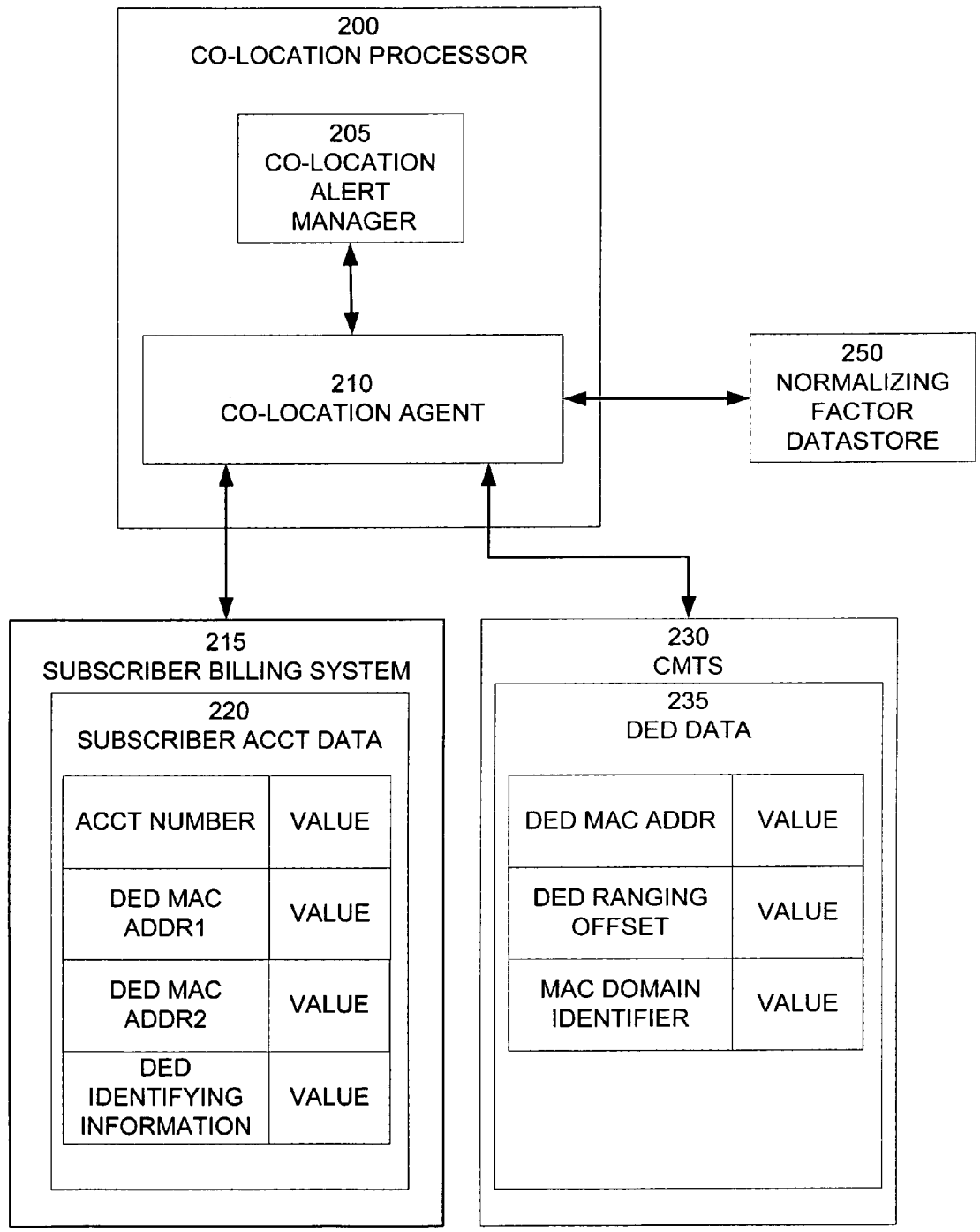
FIG. 2 illustrates the logical components of a co-location processor according to an embodiment of the present invention.

FIG. 2 illustrates the logical components of a co-location processor according to an embodiment of the present invention.

A co-location processor (CLP) 200 comprises a co-location agent (CLA) 210 and a co-location alert manager (CLAM) 205. The CLA 210 periodically polls a subscriber billing system 215 to acquire subscriber account data 220. According to an embodiment of the present invention, subscriber account data 220 comprises a subscriber account number, the MAC addresses of the DOCSIS-enabled devices (DEDs) associated with that account number, and DED identifying information. By way of illustration and not as limitation, DED identifying information comprises a manufacturer identifier, a model identifier, a release identifier, and a firmware identifier. As will be appreciated by those skilled in the art, subscriber account data may be acquired from other systems or datastructures without departing from the scope of the present invention. In this way, CLA 210 acquires a list of all DEDs associated with a single account.

The CLA 210 uses MAC addresses to poll a CMTS 230 for DED data 235. According to an embodiment of the present invention, DED data 235 comprises a DED MAC address, a DED ranging offset value expressed in "ticks," and a MAC domain identifier on the CMTS to which the DED is assigned. The CLA 210 is thus "aware" of all of the DED devices associated with each subscriber account as well as each DED associated with each CMTS MAC domain.

According to an embodiment of the present invention, the CLA 210 uses the DED identifying information to obtain a ranging offset normalizing factor for each DED associated with the subscriber from normalizing factor datastore 250. The CLA applies the normalized ranging offset factor of a DED to the ranging offset value for that DED to obtain a normalized ranging offset value. This normalized ranging offset value may be used as a measure of distance between DEDs and a CMTS.

According to an embodiment of the present invention, the MAC address of a DED is associated with the giaddr of the CMTS to which the DED is connected and to the MAC domain identifier. A datastore stores MAC address/giaddr/MAC domain information multiple CMTSs within the cable network. In one embodiment of the present invention, that datastore comprises a central database. In an alternative embodiment, the datastore comprises a distributed database.

DEDs associated with a single user account that are co-located at a subscriber location will be connected to a single MAC domain on a single CMTS. That is, a single subscriber location should not span multiple MAC domains. By comparing the MAC address/giaddr/MAC domain information for DEDs assigned to a particular subscriber, MAC domain and CMTS violations can be detected across the networks of an MSO. Additionally, DEDs associated with a single user account that are co-located at a subscriber location will have DED normalized ranging offset values that are within a few offset units of each other. Any significant discrepancy in the DED normalized ranging offset values is indicative of devices that are not co-located.

Figure 3:
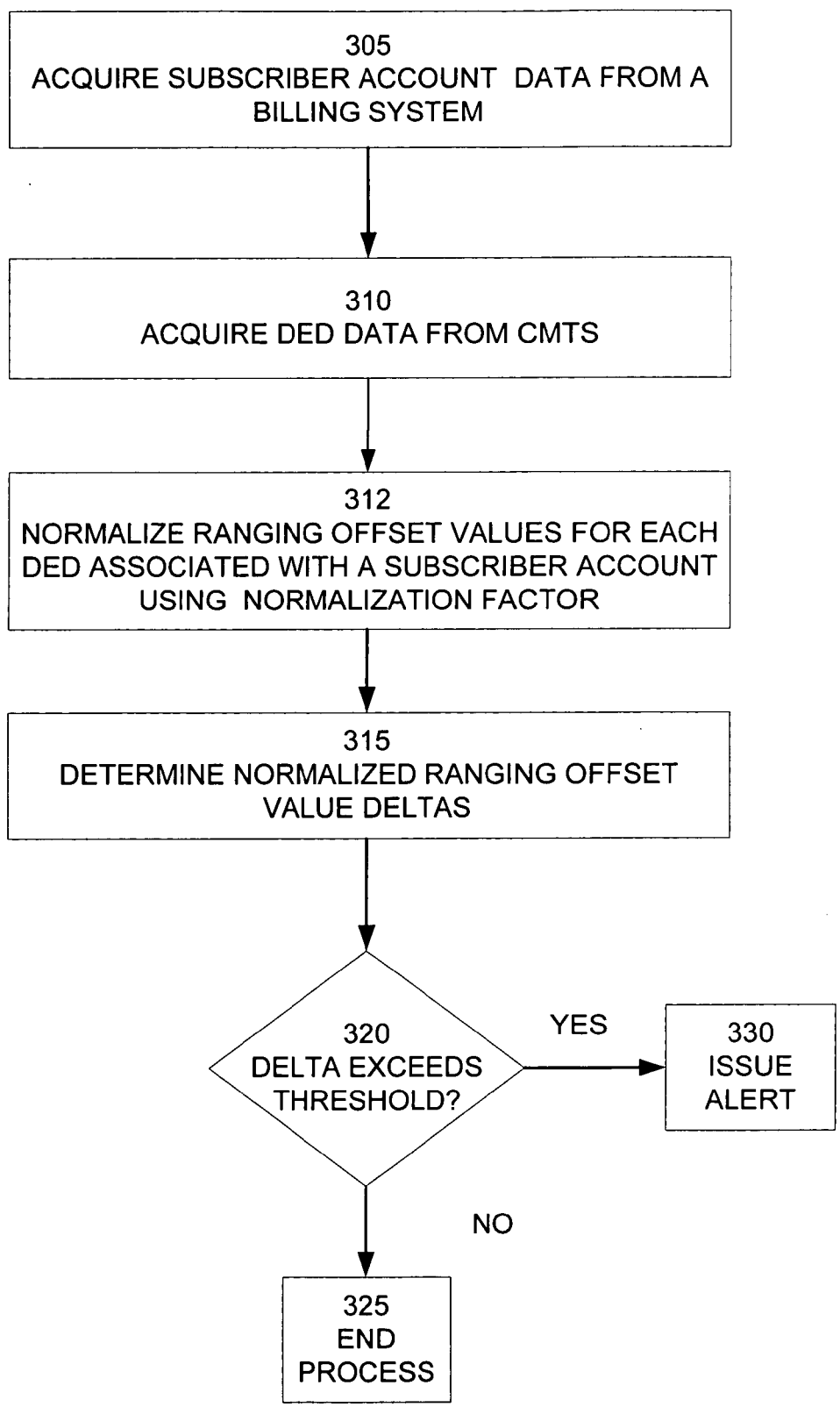
FIG. 3 illustrates a logical flow of a process by which the co-location of multiple DOCSIS-compliant devices associated with a subscriber is verified according to an embodiment of the present invention.

FIG. 3 illustrates a logical flow of a process by which the co-location of multiple DOCSIS-compliant DEDs associated with a subscriber is verified according to an embodiment of the present invention.

According to an embodiment of the present invention, subscriber account data is acquired from a billing system 305. According to an embodiment of the present invention, subscriber account data comprises a subscriber account number, the MAC addresses of the DEDs associated with that account number, and DED identifying information. By way of illustration and not as limitation, DED identifying information comprises a manufacturer identifier, a model identifier, a release identifier, and a firmware identifier. As will be appreciated by those skilled in the art, subscriber account data may be acquired from other systems or datastructures without departing from the scope of the present invention.

DED data is acquired from the CMTS associated with the subscriber 310. According to an embodiment of the present invention, DED data comprises a DED MAC address, a DED ranging offset value expressed in "ticks," and a MAC domain identifier on the CMTS to which the DED is assigned. The ranging offset value of a DED is normalized using a normalization factor associated with the DED 312.

The normalized ranging offset value "deltas" or differences are determined 315 for each of the DEDs associated with the subscriber account. According to an embodiment of the present invention, a "gross" delta is determined by comparing the DED with the highest normalized ranging offset value to the DED with the lowest normalized ranging offset value. In yet another embodiment of the present invention, "relative" deltas are determined for a DED relative to the other DEDs associated with the subscriber account.

A determination is made whether a delta exceeds a predetermined threshold 320. If a delta does not exceed a predetermined threshold, the process ends 325. If a delta exceeds a predetermined threshold, an alert is issued 330. The threshold determination may be applied to a "gross" delta or a set of "relative" deltas. A threshold determination applied to a gross delta will identify with high confidence a DED that is not co-located with at least one other DED associated with a subscriber account. A threshold determination applied to a set of "relative" deltas will identify with high confidence which DEDs are co-located and which are not.

Figure 4:
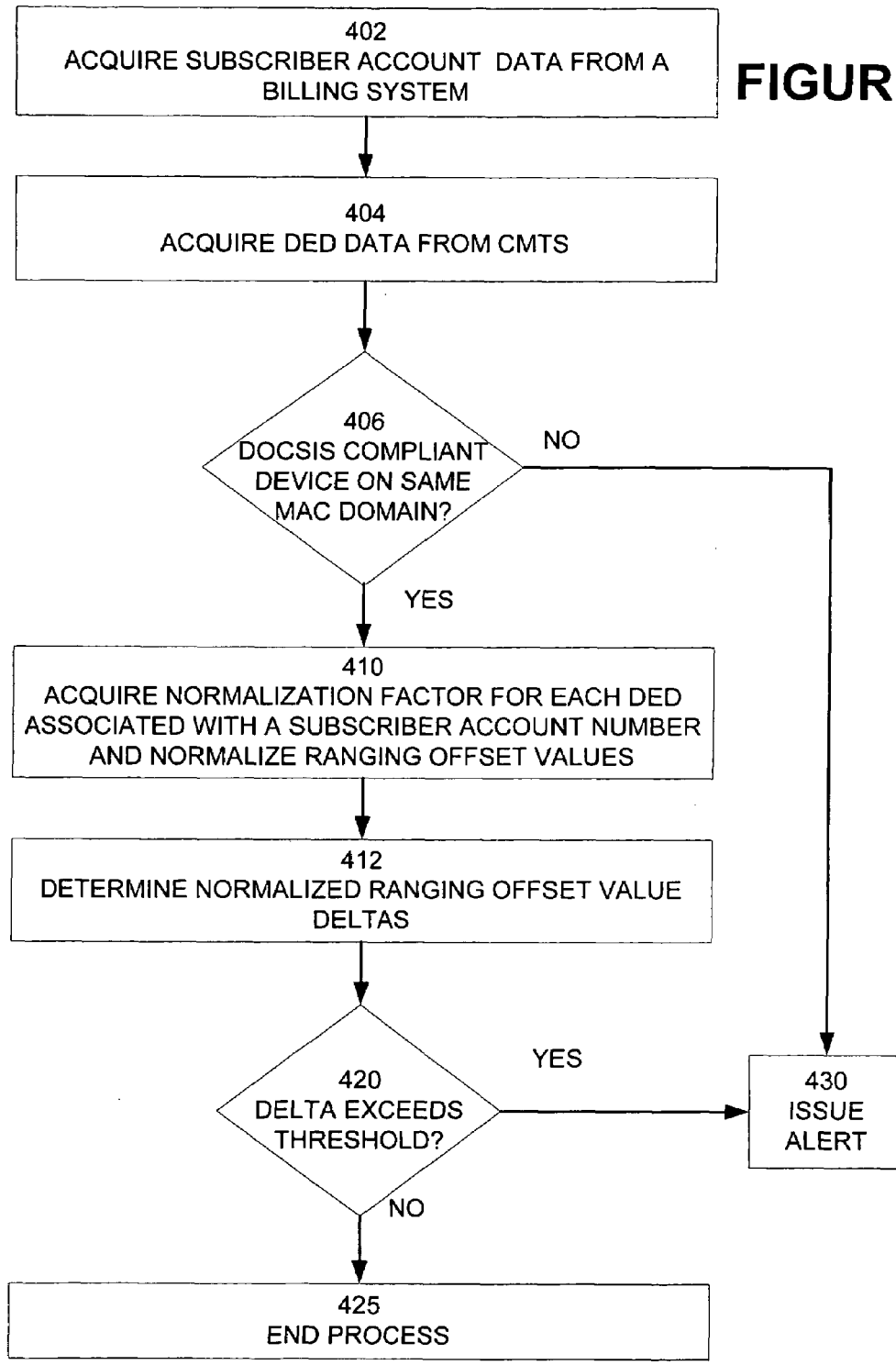
FIG. 4 illustrates a logical flow of an alternate process by which the co-location of multiple DOCSIS-compliant devices associated with a subscriber is verified according to an embodiment of the present invention.

FIG. 4 illustrates a logical flow of a process by which the co-location of multiple DEDs associated with a subscriber is verified according to an alternate embodiment of the present invention. According to this embodiment of the present invention, the DED information is "filtered" twice.

Referring to FIG. 4, subscriber account data is acquired from a billing system 402. According to an embodiment of the present invention, subscriber account data comprises a subscriber account number, the MAC addresses of the DEDs associated with that account number, and DED identifying information. By way of illustration and not as limitation, DED identifying information comprises a manufacturer identifier, a model identifier, a release identifier, and a firmware identifier. As will be appreciated by those skilled in the art, subscriber account data may be acquired from other systems or datastructures without departing from the scope of the present invention.

DED data is acquired from the CMTS associated with the subscriber 404. According to an embodiment of the present invention, DED data comprises a DED MAC address, a DED ranging offset value expressed in "ticks," and a MAC domain identifier that identifies the port, also referred to as a MAC domain, on the CMTS to which the DED is connected.

A determination is made whether any of the DEDs associated with a subscriber are associated with different MAC domain identifiers on the CMTS 406. If any of the DEDs associated with a subscriber are associated with different MAC domain identifiers on the CMTS, then an alert is issued

430. If the DEDs associated with a subscriber are associated with the same MAC domain identifier on the CMTS, the ranging offset values are "normalized" using a normalization obtained for each DED associates with the subscriber account 410. The normalized ranging offset value "deltas" or differences are determined 412 for each of the DEDs associated with the subscriber account. According to an embodiment of the present invention, a "gross" delta is determined by comparing the DED with the highest normalized ranging offset value to the DED with the lowest normalized ranging offset value. In yet another embodiment of the present invention, "relative" deltas are determined for a DED relative to the other DEDs associated with the subscriber account.

A determination is made whether a delta exceeds a predetermined threshold 420. If a delta does not exceed a predetermined threshold, the process ends 425. If a delta exceeds a predetermined threshold, an alert is issued 430. The threshold determination may be applied to a "gross" delta or a set of "relative" deltas. A threshold determination applied to a gross delta will identify with high confidence a DED that is not co-located with at least one other DED associated with a subscriber account. A threshold determination applied to a set of "relative" deltas will identify with high confidence which DEDs are and which are not co-located.

According to an embodiment of the present invention, wide deviations between the physical distances to a CMTS for multiple devices within a single household are noted at the time of installation. For these households, the pre-determined threshold against which a normalized ranging offset value delta is compared is adjusted to reflect the disparity in the physical distances between DEDs and a CMTS. Accordingly, the CLA is configured with different threshold values to avoid false alarms for these subscriber accounts.

Figure 5:
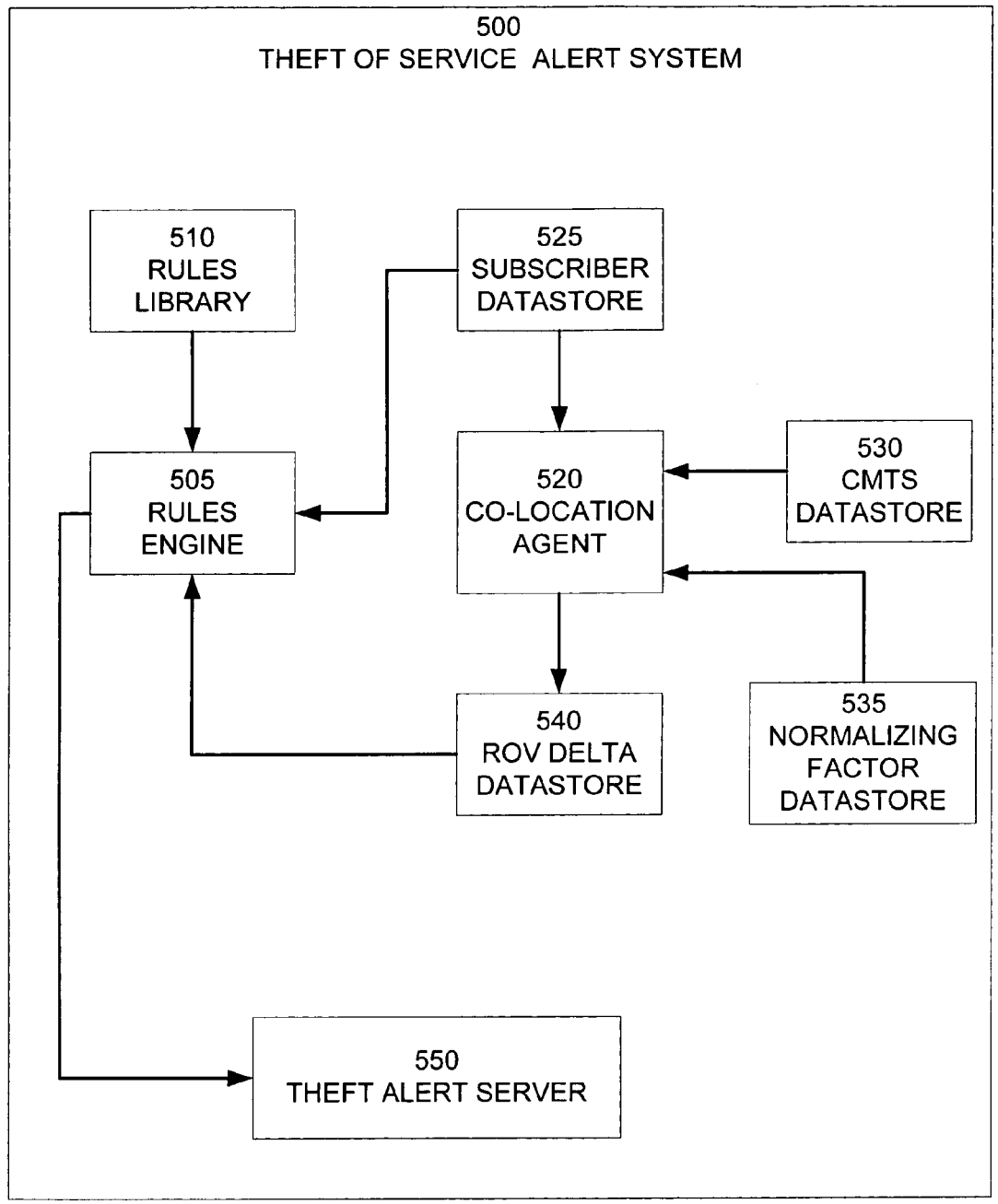
FIG. 5 illustrates the logical components of a service theft alert system according to an embodiment of the present invention.

FIG. 5 illustrates the logical components of a service theft alert system according to an embodiment of the present invention. Referring to FIG. 5, service theft alert system 500 comprises a rules engine 505, a rules engine library 510, a co-location agent (CLA) 520, a subscriber datastore 525, a CMTS datastore 530, a normalizing factor datastore 535, a co-location violation datastore 540, and a theft alert server 550.

CLA 520 periodically polls the subscriber datastore 525 to acquire subscriber account data. According to an embodiment of the present invention, subscriber account data comprise a subscriber account number, the MAC addresses of the DOCSIS-enabled devices (DEDs) associated with that account number and DED identifying information. By way of illustration and not as limitation, DED identifying information comprises a manufacturer identifier, a model identifier, a release identifier, and a firmware identifier. As will be appreciated by those skilled in the art, subscriber account data may be acquired from other systems or datastructures without departing from the scope of the present invention. In this way, CLA acquires a list of all DEDs associated with a single account.

The CLA uses MAC addresses to poll CMTS datastore 530 for DED data. According to an embodiment of the present invention, DED data comprises a DED MAC address, a DED ranging offset value expressed in "ticks," and a MAC domain identifier on the CMTS to which the DED is assigned. The CLA 520 is thus "aware" of all of the DED devices associated with each subscriber account as well as each DED associated with each CMTS MAC domain. DEDs associated with a single user account that are co-located at a subscriber location will be connected to a single MAC domain on a single CMTS. Thus, a single subscriber location should not span multiple MAC domains.

The ranging offset values in a single user account are "normalized" using a normalization factor obtained for each DED associated with the subscriber account from normalizing factor datastore 535. The normalized ranging offset value "deltas" or differences are determined for each of the DEDs associated with the subscriber account. Additionally, DEDs associated with a single user account that are co-located at a subscriber location will have normalized ranging offset values that are within a few offset units of each other. When a discrepancy in the normalized ranging offset values is detected that exceeds a threshold value, a discrepancy record for the DEDs associated with the subscriber's account is created. The threshold determination produces a set of relative "deltas" representing the difference in the normalized ranging offset values of each DED relative all other DEDs associated with the subscriber account. The relative deltas representing the differences in the normalized ranging offset values of the DEDs associated with the subscriber is captured in the discrepancy record that is stored in ranging offset value (ROV) delta datastore 540.

Rules engine 505 receives a discrepancy record from the ROV delta datastore 540 and the subscriber account data from the subscriber datastore 525. The rules engine 505 applies a theft rule obtained from the rules library and determines whether the data support a determination that a theft of service has occurred. If a theft of service has been determined to have occurred, the determination is reported to theft alert server 550.

According an embodiment of the present invention, the theft rule weighs the magnitude of the normalized ranging offset delta values in the discrepancy report, previous discrepancy reports, the time that the discrepancies have persisted, and the services the subscriber is authorized to receive to determine whether a theft of service has occurred. As will be appreciated by those skilled in the art, theft rules may apply numerous parameters without departing from the scope of the present invention. By way of illustration, data relating the usage of services by the subscriber may also be weighed in the determination of whether a theft of service has occurred.

In another embodiment of the present invention, discrepancies in ranging offset values may be confirmed before remedial action is taken. In this embodiment, a confirmation command is sent to DEDs associated with a single user account that are suspected of not being co-located and responses from the DEDs are evaluated to determine whether the lack of co-location can be confirmed. For example, and not as a limitation, the confirmation command may be a high resolution PING (HR PING) command. For the purposes of present Application, a HR PING command reports loop times to nano-second granularity. However, other commands that produce a measure of time for a command to be sent to a DED and response received from that DED may be used for this purpose. Additionally, the results of the confirmation command may be normalized to reflect differences in the particular packet processing delays of a model/release of DED operating a specific firmware release.

A system and method for determining whether DOCSIS-enabled devices in a HFC cable network are co-located has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular. Moreover, a reference to a specific time, time interval, and instantiation of scripts or code segments is in all respects illustrative and not limiting.

What is claimed is:

1. A co-location processor for a hybrid-fiber-coax (HFC) cable network comprising:
   a co-location alert manager; and
   a co-location agent, wherein the co-location agent is adapted for:
   acquiring a first ranging offset value associated with a first DOCSIS-enabled device (DED) and a second ranging offset value associated with a second DED, wherein the first and second DEDs are associated with a subscriber account;
   applying a first normalization factor to the first ranging offset value to obtain a first normalized ranging offset value and applying a second normalization factor to the second ranging offset value to obtain a second normalized ranging offset value;
   determining a "delta" offset value equal to the absolute value of the difference between the first normalized ranging offset value and the second normalized ranging offset value;
   determining whether the delta offset value exceeds a predetermined threshold;
   sending an alert to the co-location alert manager if the delta offset value exceeds a predetermined threshold;
   acquiring a first cable MAC domain identifier associated with the first DED and a second MAC domain identifier associated with the second DED:
   determining whether the first MAC domain identifier differs from the second MAC domain identifier; and
   sending an alert to the alert manager if the first MAC domain identifier differs from the second MAC domain identifier.

2. The co-location processor of claim 1, wherein a DED comprises a standalone cable modem.

3. The co-location processor of claim 1, wherein a DED comprises a component within a device connectable to the HFC cable network.

4. The co-location processor of claim 1, wherein the co-location agent is further adapted for acquiring subscriber account data for the subscriber account, wherein subscriber account data comprises a subscriber account number, a first MAC address associated with the first DED and a second MAC address associated with the second DED.

5. The co-location processor of claim 4, wherein the first and second ranging offset values are acquired from a cable modem termination system using the first and second MAC addresses.

6. The co-location processor of claim 4, wherein the alert manager is adapted for:
   receiving an alert from the co-location agent; and
   routing the alert to a customer support center, wherein the customer support center is associated with the subscriber account number.

7. The co-location processor of claim 1, wherein the co-location agent is further adapted for:
   sending a confirmation command to the first and second DEDs;
   receiving a first response from the first DED to the first confirmation command and a second response from the second DED to the second confirmation command;
   determining from the first and second response whether the first DED and second DED are co-located; and
   sending a confirmed alert to the co-location alert manager if the first DED and second DED are not co-located.

8. A cable theft of service alert system comprising:
   a co-location agent, wherein the co-location agent is adapted for:
   acquiring a first ranging offset value associated with a first DOCSIS-enabled device (DED) and a second ranging offset value associated with a second DED, wherein the first and second DEDs are associated with a subscriber account;
   applying a first normalization factor to the first ranging offset value to obtain a first normalized ranging offset value and applying a second normalization factor to the second ranging offset value to obtain a second normalized ranging offset value;
   determining a "delta" offset value equal to the absolute value of the difference between the first normalized ranging offset value and the second normalized ranging offset value; and
   creating a discrepancy record comprising the DED values and the delta offset values if the delta offset value exceeds a predetermined threshold; and
   a rules engine adapted for:
   receiving the discrepancy record associated with the subscriber;
   receiving subscriber account data from a subscriber datastore;
   applying a theft rule to the delta offset values and the subscriber account data;
   determining whether a theft of service has occurred;
   sending an alert to a theft of service server if the theft of service has occurred;
   acquiring a first cable MAC domain identifier associated with the first DED and a second MAC domain identifier associated with the second DED:
   determining whether the first MAC domain identifier differs from the second MAC domain identifier; and
   sending an alert to the alert manager if the first MAC domain identifier differs from the second MAC domain identifier.

9. The cable theft of service alert system of claim 8, wherein a DED comprises a standalone cable modem.

10. The cable theft of service alert system of claim 8, wherein a DED comprises a component within a device connectable to the HFC cable network.

11. The cable theft of service alert system of claim 8, wherein the co-location agent is further adapted for acquiring subscriber account data for the subscriber account, wherein subscriber account data comprises a subscriber account number, a first MAC address associated with the first DED and a second MAC address associated with the second DED.

12. The cable theft of service alert system of claim 11, wherein the first and second ranging offset values are acquired from a cable modem termination system using the first and second MAC addresses.

13. The cable theft of service alert system of claim 11, wherein the alert manager is adapted for:
   receiving an alert from the co-location agent; and
   routing the alert to a customer support center, wherein the customer support center is associated with the subscriber account number.

14. The cable theft of service alert system of claim 8, wherein the co-location agent is further adapted for:
   sending a confirmation command to the first and second DEDs;

receiving a first response from the first DED to the first confirmation command and a second response from the second DED to the second confirmation command;

determining from the first and second response whether the first DED and second DED are co-located; and sending a confirmed alert to the co-location alert manager if the first DED and second DED are not co-located.

15. A method for confirming that DOCSI-compliant devices operating in a hybrid-fiber-coax (HFC) cable network are co-located comprising:

acquiring a first ranging offset value associated with a first DOCSIS-enabled device (DED) and a second ranging offset value associated with a second DED, wherein the first and second DEDs are associated with a subscriber account;

applying a first normalization factor to the first ranging offset value to obtain a first normalized ranging offset value and apply a second normalization factor to the second ranging offset value to obtain a second normalized ranging offset value;

determining a "delta" offset value equal to the absolute value of the difference between the first normalized ranging offset value and the second normalized ranging offset value;

determining whether the delta offset value exceeds a predetermined threshold;

sending an alert to a co-location alert manager if the delta offset value exceeds the predetermined threshold;

acquiring a first cable MAC domain identifier associated with the first DED and a second MAC domain identifier associated with the second DED;

determining whether the first MAC domain identifier differs from the second MAC domain identifier; and sending an alert to the alert manager if the first MAC domain identifier differs from the second MAC domain identifier.

16. The method for confirming that DOCSIS-compliant devices operating in an HFC cable network are co-located of claim 15, wherein a DED comprises a standalone DED.

17. The method for confirming that DOCSJS-compliant devices operating in an HFC cable network of claim 15 are co-located, wherein a DED comprises a component within a device connectable to the HFC cable network.

18. The method for confirming that DOCSJS-compliant devices operating in an HFC cable network are co-located of claim 15 further comprising acquiring subscriber account data for the subscriber account, wherein subscriber account data comprises a subscriber account number, a first MAC address associated with the first DED and a second MAC address associated with the second DED.

19. The method for confirming that DOCSIS-compliant devices operating in an HFC cable network are co-located of claim 18, wherein the acquiring the first ranging offset value associated with the first DOCSIS-enabled device (DED) and the second ranging offset value associated with the second DED comprises polling a cable modem termination system using the first and second MAC addresses.

20. The method for confirming that DOCSIS-compliant devices operating in an HFC cable network are co-located of claim 15 further comprising:

sending a confirmation command to the first and second DEDs;

receiving a first response from the first DED to the first confirmation command and a second response from the second DED to the second confirmation command;

determining from the first and second response whether the first DED and second DED are co-located; and sending a confirmed alert to the co-location alert manager if the first DED and second DED are not co-located.

* * * * *